Figure 1:
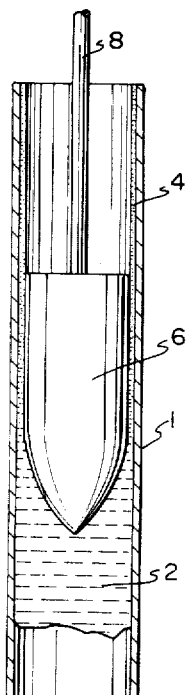
Figure 1:
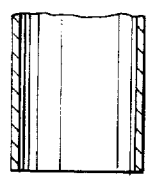

United States Patent
Wood

[11] 3,901,761
[45] Aug. 26, 1975

[54] NUCLEAR FUEL ELEMENT AND A METHOD OF MANUFACTURE THEREOF

[75] Inventor: James Clive Wood, Deep River, Canada

[73] Assignee: Canadian Patents and Development Limited, Ottawa, Canada

[22] Filed: Aug. 17, 1973

[21] Appl. No.: 389,120

[30] Foreign Application Priority Data
Dec. 1, 1972  Canada ............................. 158460

[52] U.S. Cl. .......................... 176/82; 117/132 BS
[51] Int. Cl.² ........................................ G21C 3/20
[58] Field of Search ........... 176/68, 82; 117/132 BS

[56] References Cited
UNITED STATES PATENTS
| | | | |
|---|---|---|---|
| 3,053,743 | 9/1962 | Cain | 176/82 |
| 3,119,747 | 1/1964 | Wallace et al. | 176/82 |
| 3,778,885 | 12/1973 | Stoll | 176/82 |

Primary Examiner—Stephen C. Bentley
Attorney, Agent, or Firm—Francis W. Lemon

[57] ABSTRACT

A nuclear fuel element having a sheath of zirconium or a zirconium alloy and a cross-linked siloxane lacquer coating on the inner surface of the sheath and separating the nuclear fuel material from the sheath. The siloxane lacquer coating retards cracking of the sheath by iodine vapour emitted by the fuel during burn-up, and acts as a lubricant for the fuel to prevent rupture of the sheath by thermal ratchetting of the fuel against the sheath and caused by differential thermal expansion between the fuel and the sheath.

A silicone grease is applied as a thin layer in the sheath and then baked so that oxidative cleavage of the side chains of the grease occurs to form a cross-linked siloxane lacquer coating bonded to the sheath.

6 Claims, 4 Drawing Figures

PATENTED AUG 26 1975 3,901,761

SHEET 1 OF 2

NUCLEAR FUEL ELEMENT AND A METHOD OF MANUFACTURE THEREOF

This invention relates to a nuclear fuel element and a method of manufacture thereof.

Fuel elements comprising a zirconium or zirconium alloy fuel sheath charged with nuclear fuel material and sealed at both ends are widely used in, for example, water cooled nuclear reactors. The nuclear fuel material may be in the form of ceramic pellets. These fuel elements are secured together side-by-side in the form of fuel element bundles and may be stacked one upon another in an array of fuel channels in the reactor core.

It is usual to transpose or shuffle fuel element bundles a number of times, during their useful life, from one position in the reactor core to another in such a pattern that temperature differences of various parts of the core are kept within tolerable limits. This transposing or shuffling of fuel element bundles often entails moving fuel element bundles from lower power positions in the reactor core to high power positions. Moving fuel element bundles from lower power positions in the reactor core to high power positions can result in rupture of the fuel sheath caused by power increases producing differential thermal expansions of the fuel and introducing undue stresses in fuel sheaths which have become embrittled by neutron irradiation and contaminated internally with fission products from the nuclear fuel material. The nuclear fuel material can unduly stress the fuel sheath, through differential thermal expansion between the nuclear fuel material and the fuel sheath by what is known as a thermal ratchetting effect.

The thermal ratchetting effect occurs when, say, ceramic pellets forming the nuclear fuel and the fuel sheath differentially expand so that the fuel wedges against the internal surface of the fuel sheath.

Cracking of the fuel sheath occurs through the corrosive effects of iodine and possibly other fission products which are produced from the nuclear fuel during the burn-up of the nuclear fuel.

The rupture of a fuel sheath in the reactor core will cause contamination of coolant passing along the fuel channels containing the fuel element bundles, and it will be seen from above that the chances of this occurring can be lessened by:

1. providing a lubricating coating on the inside surface of each fuel sheath so that, during differential thermal expansion of the nuclear fuel material and the fuel sheath, the nuclear fuel material and the fuel sheath will easily slide relative to one another and so lessen the tendency of the thermal ratchetting effect occurring, and 2. by providing a corrosion resisting coating on the inside surface of each fuel sheath so that corrosion effects and embrittlement of the fuel sheath by iodine and possibly other fission products produced from the nuclear fuel material during burn-up is substantially retarded.

It is an object of the present invention to provide a nuclear fuel element and a method of manufacture thereof, wherein the fuel sheath is provided with a lubricating coating on the inside surface to reduce the hazard of rupture of the fuel sheath by differential thermal expansion between the nuclear fuel material and the fuel sheath.

It is another object of the present invention to provide a nuclear fuel element and a method of manufacture thereof, wherein the fuel sheath is provided with a corrosion resisting coating which will substantially retard the corrosion effects and cracking of the fuel sheath by the combined action of stress and iodine, and possibly other fission products from the nuclear fuel material during burn-up.

According to the present invention there is provided a nuclear fuel element, comprising a nuclear fuel material, a fuel sheath containing the nuclear fuel material and of a material selected from the group comprising zirconium and zirconium alloys, and a cross-linked siloxane lacquer coating bonded to the inner surface of the fuel sheath and separating the nuclear fuel material therefrom as a lubricating and corrosion resisting coating.

Further according to the present invention there is provided a method of manufacturing a nuclear fuel element, comprising:

a. providing a fuel sheath, open at one end, of a material selected from the group comprising zirconium and zirconium alloys, and an inner coating on the fuel sheath of a silicone grease, b. heating the inner coating in the presence of oxygen so that oxidative cleavage of side chains of the silicone grease occurs to form a cross-linked siloxane lacquer coating from the inner coating, which is bonded to the inner surface of the fuel sheath, c. charging the fuel sheath with nuclear fuel, and d. welding an end cap of a material selected from the group comprising zirconium and zirconium alloys to the open end of the fuel sheath to seal the interior thereof.

Figure 2:
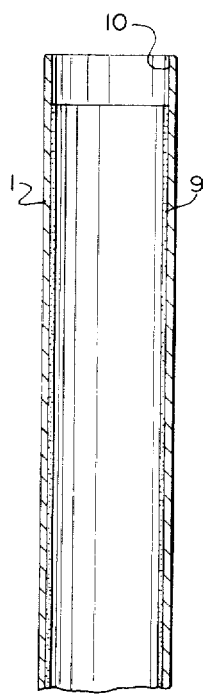
Figure 2:
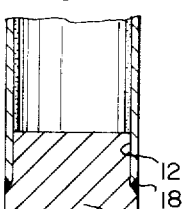

In the accompanying drawings which illustrate, by way of example, an embodiment of the present invention, FIG. 1 is a sectional side view of an open ended fuel sheath being coated internally with a silicone grease, FIG. 2 is a sectional side view of the fuel sheath shown in FIG. 1 with the excess silicone grease removed and one end plug welded to the fuel sheath.

Figure 3:
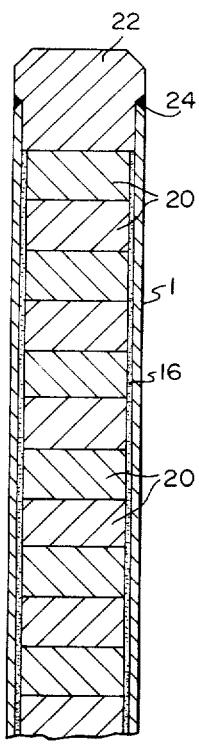
Figure 3:
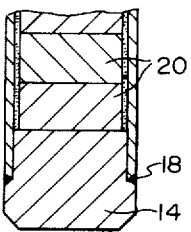
Figure 4:
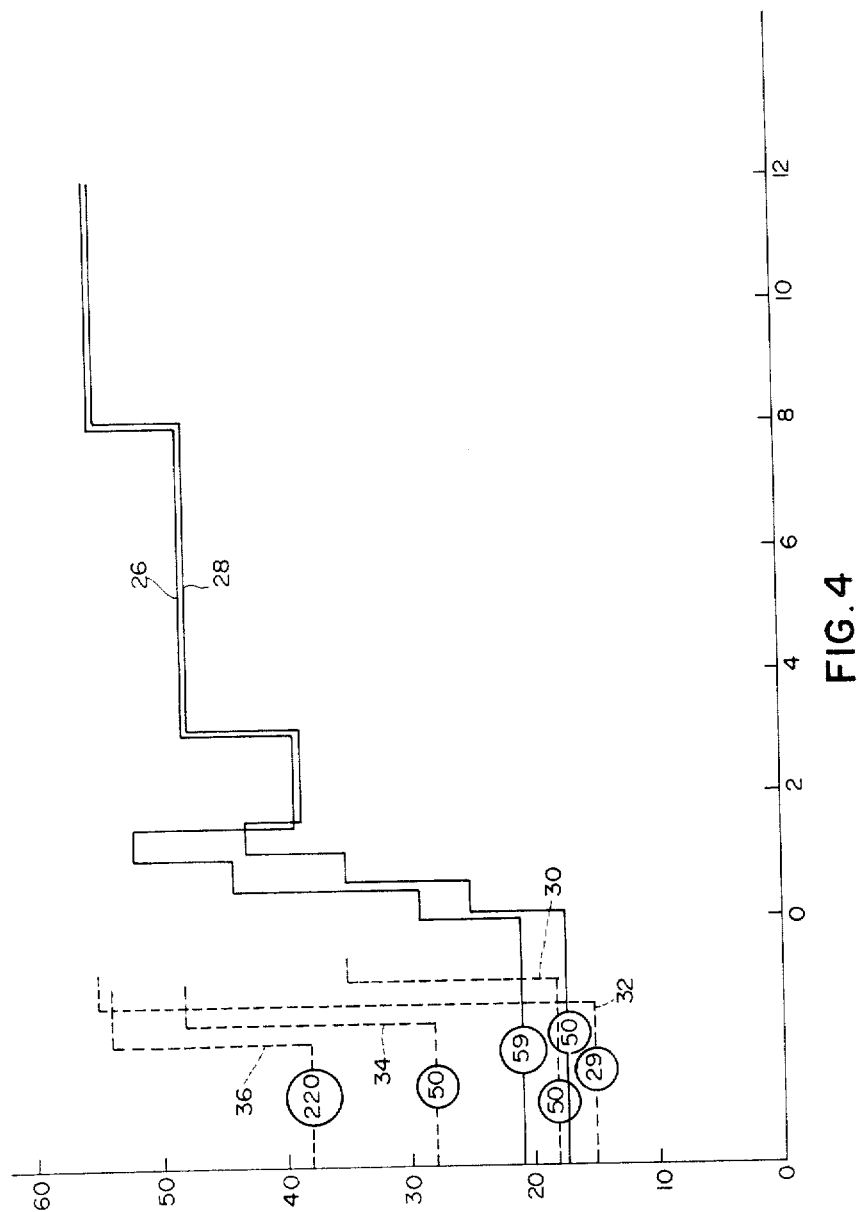

FIG. 3 is a sectional side view of the fuel sheath shown in FIG. 1 with the silicone grease baked to form a lacquer coating, and filled with fuel pellets, and then sealed with another end plug, and FIG. 4 is a graph showing the power increases which caused cracking of conventional fuel elements and those withstood according to the present invention.

Referring to FIG. 1 an open ended fuel sheath 1 of zirconium, or a zirconium alloy comprising, for example, by weight 1.2 to 1.7% tin, 0.18 to 0.24% iron, 0.07 to 0.13% chromium, total iron + chromium + nickel between 0.28 and 0.37%, oxygen content between 1,000 and 1,400 ppm, balance zirconium except for impurities, after being cleaned in trichorethylene, washed in alcohol and furnace dried at 80°C, has a silicone grease 2 scraped from a spatula (not shown) into the upper end and then distributed as a coating 4 along the inner surface of the fuel sheath 1 by means of a bullet-shaped plunger 6. It is advantageous to rotate the bullet-shaped plunger 4 as it is pushed into the fuel sheath 1, by means of a rod 8, so that the coating 4 is substantially uniform in thickness and is continuous. A second bullet-shaped plug (not shown), which is slightly larger than the plug 6, and which is smaller than the bore of the fuel sheath 1 by 0.012 cm, is then pushed along the bore of the fuel sheath 1 from the upper end and rotated to form the coating 4 into a thin, coherent silicone grease layer or coating 9 (FIG. 2).

As shown in FIG. 2, the ends 10 and 12 of the bore of the fuel sheath 1 are wiped clean of the silicone grease layer 9 and an end plug 14, of the same metal or alloy as the tube 1, is positioned in the lower end of the fuel sheath 1 and seal welded thereto by an argon shrouded, arc weld 18.

The fuel sheath 1 with the layer 9 is then baked at 300°C in a partial vacuum, with oxygen present, for 90 hours so that the layer 9 is baked into a cross-linked siloxane lacquer coating 16 (FIG. 3) bonded to the surface of the fuel sheath 1 by the interaction therewith of silicon-oxygen bonding electrons. The siloxane layer 9 is a long chain compound whose molecules are silicon-oxygen chains with alkyl or aryl side chains bonded to each side of the silicon atom and cross-linking results from oxidative cleavage of the side chains of the layer 8, occurring because the coating 8 is baked in the presence of oxygen.

Fuel pellets 20 of uranium dioxide are then stacked in the fuel sheath 1 in an inert atmosphere, in this instance an argon atmosphere, and then an end cap 22 is seal welded by weld 24 to the fuel sheath 1.

Laboratory experiments have been made to establish that at 300°C in an environment of free iodine vapour, the stress corrosion cracking resistance of ring specimens of an alloy, comprising by weight 1.2 to 1.7% tin, 0.18 to 0.24% iron, 0.07 to 0.13% chromium, total iron + chromium + nickel between 0.28 and 0.37%, oxygen content between 1,000 and 1,400 ppm, balance zirconium except for impurities, is greatly improved by a siloxane lacquer coating. Also experimental fuel elements having siloxane lacquer coatings have been subjected to power increase tests in a nuclear reactor, and these fuel elements did not fail whereas conventional, uncoated fuel elements did fail under similar conditions. In the experiments the power of the siloxane coated elements was increased in steps with intermediate holds and so the experiments may not have been as severe as for the conventional, uncoated fuel elements.

Laboratory Experiments

In particular experiments, rings of the above alloy were cut from fuel sheathing tubes and split longitudinally on one side, then stressed by opening the slot with a wedge of the same alloy giving the maximum tensile stress at the inner surface of the tube opposite the inserted wedge. After cleaning and drying, the specimens were placed in glass capsules of known volume with a weighed amount of iodine. Each capsule was then evacuated by a rotary pump to remove as much air and moisture as possible without an appreciable loss of iodine. Then the iodine was frozen at liquid nitrogen temperature and the pressure reduced to less than $10^{-3}$ Torr, using a mercury diffusion pump, before sealing the capsules. The sealed capsules were placed in a heated furnace and inspected periodically to see whether any of the rings had cracked.

The experiment described in the above was used to test four stressed, slotted rings that had been coated with a siloxane lacquer according to the present invention, and four control specimens which had not. The amount of iodine per unit surface area of alloy in the test capsules was $10^{-4}$ g/cm$^2$ and the temperature was 300±2°C. All four specimens without a siloxane lacquer coating failed after between 200 and 300 hours exposure to iodine but the four siloxane lacquer coated rings remained intact for the 1,000 hour duration of the test. Metallographic sectioning revealed no incipient cracks in the siloxane lacquer coated rings.

In-Reactor Experiment

Four siloxane lacquer coated elements according to the present invention and having sheaths of the above alloy were irradiated in-reactor at low power ratings ( $\int \lambda d\theta \approx 20$ W/cm)+ until they had accumulated a burnup of 50–60 MWh/kg U. They were then moved in stages through a number of power increases to a power rating of $\int \lambda d\theta \approx 55$ W/cm and remained intact. $\int \lambda \, d\theta$ is the power per unit length of a fuel element.

In FIG. 4 the mid-plane power rating (in Watts/cm), that is the power rating midway along the length of a siloxane lacquer coated fuel elements, is plotted vertically against the time (in days) from the moment the fuel elements reach a burn up of about 50 MWh/kgU in a nuclear reactor. Thus the period of time before zero represents that required for the siloxane lacquer coated fuel elements to reach a burn up of about 50 MWh/kgU. The continuous lines 26 and 28 are for siloxane lacquer coated fuel elements while the dotted lines 30, 32, 34 and 36 are for conventional fuel elements having no siloxane lacquer coating. The numbers 29, 50, 59 and 220 are the magnitudes of the burnups of the fuel elements in MWh/kgU. It should be noted that for each graph the power increase occurs during the vertical portions of the graph, and it is from this stage that failure of a fuel element occurs. From the graphs 26 and 28 it will be seen that in fact the power increases for these fuel elements took place in three stages, and as the tests were concerned with siloxane lacquer coated fuel elements the days were only counted from the first power increase stage for these fuel elements. This is why the zero for the time axis is displaced from the vertical axis in FIG. 4. From the graphs it will be seen that conventional fuel elements, graphs 30, 32, 34 and 36, failed before reaching a significant time after the power shift as indicated by the vertical portions of these graphs.

FIG. 4 shows at 26 and 28 the power increases withstood by four siloxane lacquer coated sheaths according to the present invention and of the above alloy. There have been many conventional fuel elements that failed on moving between power ratings indicated by 30 (21 fuel elements failed) 32 (three fuel elements failed) and 34 and 36 (where one fuel element or more failed in each test). These conventional fuel elements did not have the protection of a siloxane lacquer coating between the fuel and sheath and their failure is thought to be primarily a consequence of fission product attack or highly localized strain concentrations or a combination of the two. Half-day pauses after uprating the fuel elements were made to allow time for the detection of possible slowly rising defect signals. Failed fuel elements often remain undetected for about 6 hours after power increments — this being the time taken for sufficient fission products to escape from a fuel element against the pressure differential of coolant over the internal pressure in an element.

One novel and unique feature of this invention is the use of siloxanes in preventing stress corrosion cracking or localized strain concentrations of fuel sheathing or combination of the two. Siloxane lacquer coatings according to the present invention were not hitherto known to inhibit the stress corrosion cracking of zirconium or alloys thereof by iodine vapour. Although siloxanes are well known as lubricants they have never to the Applicant's knowledge before found service in intense radiation fields at a temperature around 300°C.

In addition, fuel element swelling simulation tests showed that siloxane lacquer coatings, according to the present invention, possessed excellent lubricating properties at 300°C. Sheath specimens, of an alloy comprising by weight 1.2 to 1.7% tin, 0.18 to 0.24% iron, 0.07 to 0.13% chromium, total iron + chromium + nickel 0.28 to 0.37%, oxygen content 1,000 to 1,400 ppm, balance zirconium except for impurities, and coated according to the present invention bulged circumferentially to elongations exceeding 30% of the original internal circumference, whereas similar sheaths, not coated according to the present invention cracked after only 5% elongation of the original circumference.

In these tests a ceramic liner was inserted in the sheaths and then an aluminum core in the liner was subjected to a compressive force to make the sheaths bulge.

I claim:

1. A nuclear fuel element, comprising a nuclear fuel material, a fuel sheath containing the nuclear fuel material and of a material selected from the group consisting of zirconium and zirconium alloys, and a baked, cross-linked siloxane lacquer coating oxidative cleavage bonded to the inner surface of the fuel sheath by silicon-oxygen bonding electrons and separating the nuclear fuel material therefrom as a lubricating and corrosion resisting coating.

2. A nuclear fuel element according to claim 1, wherein the nuclear fuel material comprises uranium dioxide.

3. A nuclear fuel element according to claim 1, wherein the nuclear fuel is in an inert atmosphere.

4. A method of manufacturing a nuclear fuel element, comprising:
   a. providing a fuel sheath, open at one end, of a material selected from the group consisting of zirconium and zirconium alloys, and an inner coating on the fuel sheath of a silicone grease,
   b. heating the inner coating in the presence of oxygen so that oxidative cleavage of side chains of the silicone grease occurs to form a baked, cross-linked siloxane lacquer coating from the inner coating, which is oxidative cleavage bonded to the inner surface of the fuel sheath by silicon-oxygen bonding electrons,
   c. charging the fuel sheath with nuclear fuel, and
   d. welding an end cap of a material selected from the group comprising zirconium and zirconium alloys to the open end of the fuel sheath to seal the interior thereof.

5. A method according to claim 4, wherein the fuel sheath is filled with an inert atmosphere before welding the end cap to the open end of the fuel sheath containing the nuclear fuel.

6. A method according to claim 4, wherein the inner coating is heated in a partial vacuum, to remove hydrocarbon products emitted by the siloxane grease during oxidative cleavage of the side chains thereof.

* * * * *